(12) United States Patent
Grohmann et al.

(10) Patent No.: US 12,261,423 B2
(45) Date of Patent: Mar. 25, 2025

(54) POWER SUPPLY AND METHOD FOR PRODUCTION THEREOF

(71) Applicant: Karlsruher Institut für Technologie, Karlsruhe (DE)

(72) Inventors: Steffen Grohmann, Weingarten (DE); Eugen Shabagin, Sandhausen (DE); David Gomse, Munich (DE); Heinz Lambach, Fischbach bei Dahn (DE); Georg Rabsch, Karlsruhe (DE); Thomas Gietzelt, Karlsruhe (DE); Michael Stamm, Landau (DE); Cornelia Schorle, Bruchsal (DE)

(73) Assignee: Karlsruher Institut für Technologie, Karlsruhe (DE)

( * ) Notice: Subject to any disclaimer, the term of this patent is extended or adjusted under 35 U.S.C. 154(b) by 0 days.

(21) Appl. No.: 17/996,870

(22) PCT Filed: Apr. 22, 2021

(86) PCT No.: PCT/EP2021/060522
§ 371 (c)(1),
(2) Date: Oct. 21, 2022

(87) PCT Pub. No.: WO2021/214213
PCT Pub. Date: Oct. 28, 2021

(65) Prior Publication Data
US 2023/0155363 A1 May 18, 2023

(30) Foreign Application Priority Data
Apr. 23, 2020 (DE) .......................... 102020205184.4

(51) Int. Cl.
*H01B 12/16* (2006.01)
*H02G 15/34* (2006.01)

(52) U.S. Cl.
CPC ............. *H02G 15/34* (2013.01); *H01B 12/16* (2013.01)

(58) Field of Classification Search
CPC ......... H01B 12/16; H02G 15/34; Y02E 40/60
(Continued)

(56) References Cited

U.S. PATENT DOCUMENTS

| 3,849,589 A | 11/1974 | Schmidt et al. |
| 4,992,623 A | 2/1991 | Briley et al. |

(Continued)

FOREIGN PATENT DOCUMENTS

| DE | 2163270 C2 | 1/1974 |
| DE | 4315580 A1 | 11/1994 |

(Continued)

OTHER PUBLICATIONS

Deciphering Ring Terminal 'Stud Size'—Wiring Depot Tech_Jan. 1-4, 2018.*

(Continued)

*Primary Examiner* — Timothy J Thompson
*Assistant Examiner* — Guillermo J Egoavil
(74) *Attorney, Agent, or Firm* — Woodard, Emhardt, Henry, Reeves & Wagner, LLP

(57) ABSTRACT

The invention relates to a power supply (110, 110' . . . ) for transporting electrical energy from an energy source (144) to a device (148) or from the device (148) to the energy source (144), the energy source (144) being arranged in a warm region (142) and the device (148) being arranged in a cold region (146). The power supply (110, 110') has a stack (118) comprising at least two films (120, 120' . . . ), each film (120, 120' . . . ) comprising an electrically conductive material which is designed to transport the electrical energy, ach film (120, 120' . . . ) having an electrical connection which is designed to receive the electrical energy or to deliver the (Continued)

electrical energy, and each film (120, 120' . . . ) comprising a plurality of flow channels (128) for conveying a fluid stream, and the fluid stream comprising a refrigerant mixture or a gas stream to be cooled or a gas stream to be liquefied. The films (120, 120', . . . ) comprised by the stack (118) have a first flow path (134) through the flow channels (128) which is designed to receive the fluid stream at a high-pressure level from the warm region (142), and a second flow path (134') through the flow channels (128) which is designed to receive the fluid stream at a low-pressure level from the cold region (146).

15 Claims, 9 Drawing Sheets

(58) Field of Classification Search
USPC .................................................. 174/125.1
See application file for complete search history.

(56) References Cited

U.S. PATENT DOCUMENTS

| 2001/0004370 | A1 | 6/2001 | Miyajima et al. | |
| 2005/0155785 | A1 | 7/2005 | Hauner et al. | |
| 2019/0367386 | A1* | 12/2019 | Austin | H01G 11/84 |

FOREIGN PATENT DOCUMENTS

| DE | 19904822 C1 | 5/2000 |
| DE | 60301064 T2 | 6/2006 |
| DE | 102005005780 A1 | 8/2006 |
| DE | 102016011311 A1 | 3/2018 |
| WO | 2003081104 A2 | 10/2003 |

OTHER PUBLICATIONS

Copper Microchannel Heat Exchanger_Borquist et al._Nov. 1-7, 2014.*
Cryogenic Mixed Refrigerant Process_Venkatarathnam_pp. 1-51 & 89 & 120-121_2008.*
Micro-Structure Heat Exchanger for Cryogenic_Gomse et al._Jan. 7, 2017.*
Num Model of Micro-Structure Heat Exchanger for Cryogenic_ Gomse et al._Sep. 1-19, 2017.*
Transient ThermoMech Simu Microchannel Heat Exchanger_ Koehler et al._Dec. 2019.*
Goloubev, Kuhlung eines resistiven HTSL-Kurzschlussstrombegrenzers mit einer Gemisch-Joule-Thomson-Kaltemaschine (Cooling of a Resistive HTSL Short-Circuit Current Limiter with a Mixed Joule-Thomson Cooling Unit), thesis, Technical University of Dresden, 2003, 112 pages, Jan. 1, 2003.
Yamaguchi et al., A Proposal of Multi-stage current lead for reduction of heat leak, Physics Procedia 27 (2012 ) 448-451, 4 pages, Jan. 1, 2012.
Gomse et al., Micro-structured heat exchanger for cryogenic mixed refrigerant cycles, IOP Conf. Series: Materials Science and Engineering 278 (2017) 012061, doi:10.1088/1757-899X/278/1/012061., 8 pages, Jan. 1, 2017.
Shabagin et al., Development of 10 kA Current Leads Cooled by a Cryogenic Mixed-Refrigerant Cycle, IOP Conf. Series: Materials Science and Engineering 502 (2019) 012138, doi 10.1088/1757-899X/502/1/012138, 6 pages, Jan. 1, 2019.
Kochenburger, Kryogene Gemischkaltekreislaufe fur Hochtemperatursupraleiter-Anwendungen (Cryogenic Mixed Refrigerant Circuits for High-Temperature Superconducting Applications), doctoral thesis, Karlsruhe Institute of Technology, 2019, ISBN 978-3-8439-3987-4, 16 pages, Jan. 1, 2019.

* cited by examiner

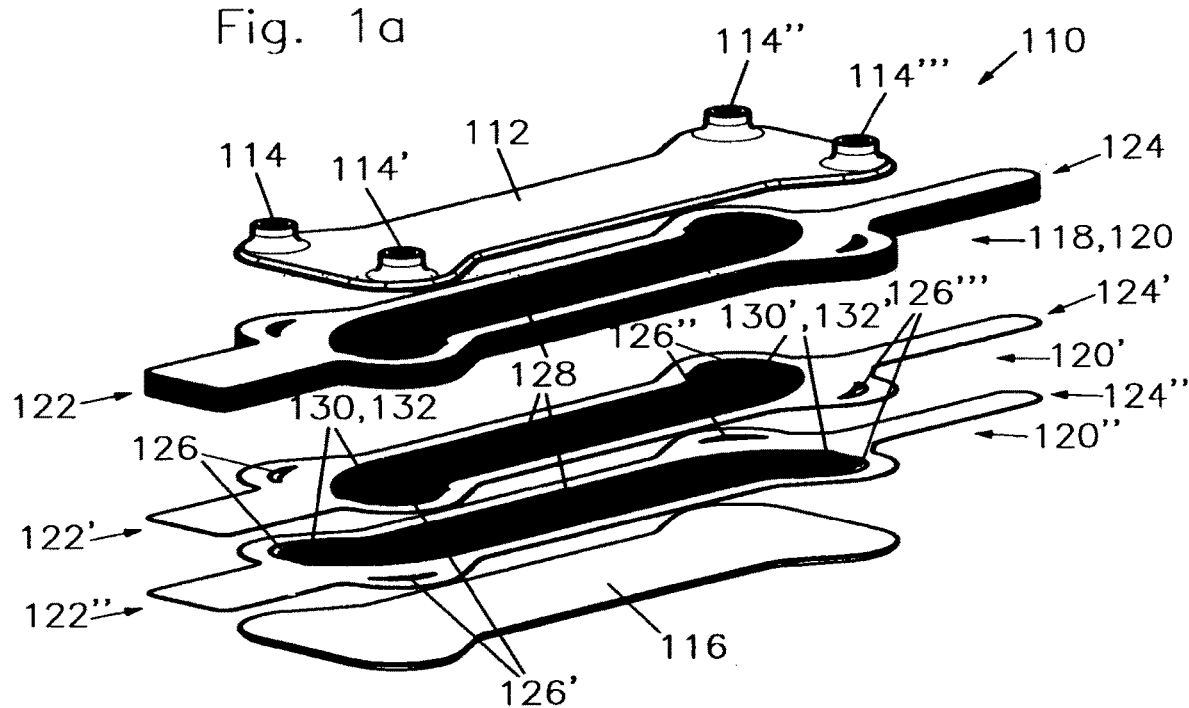

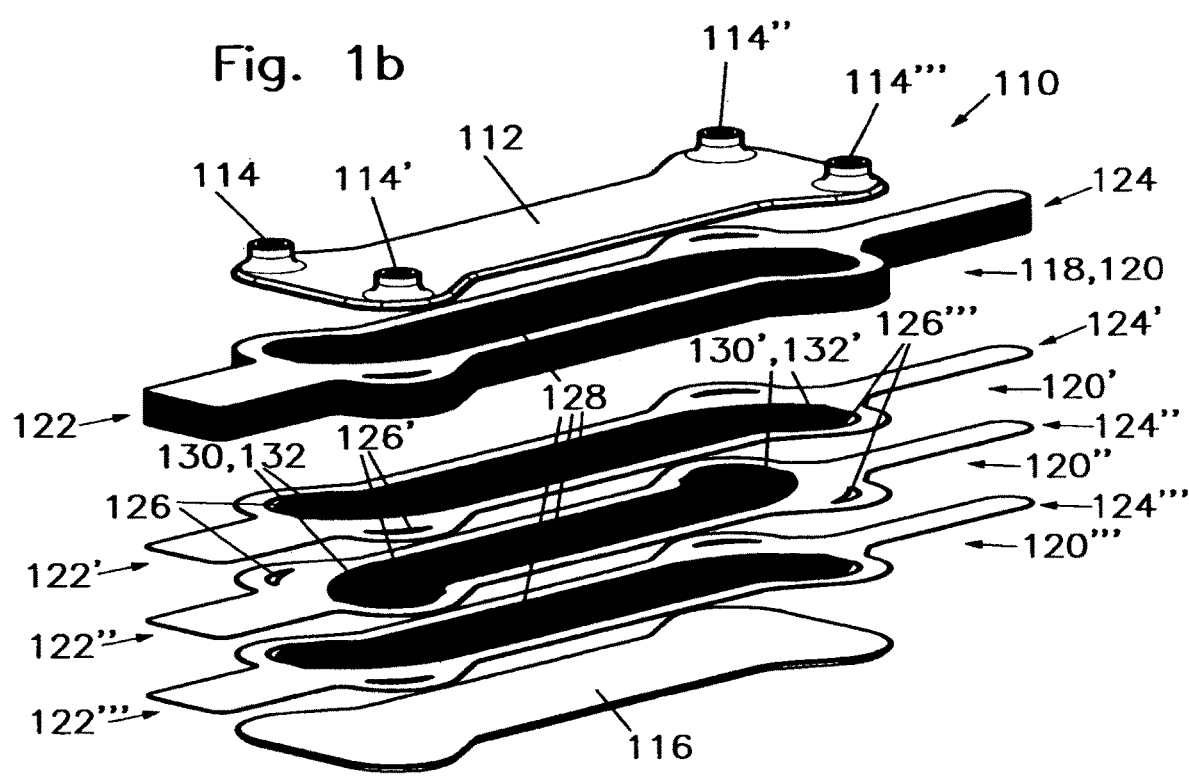

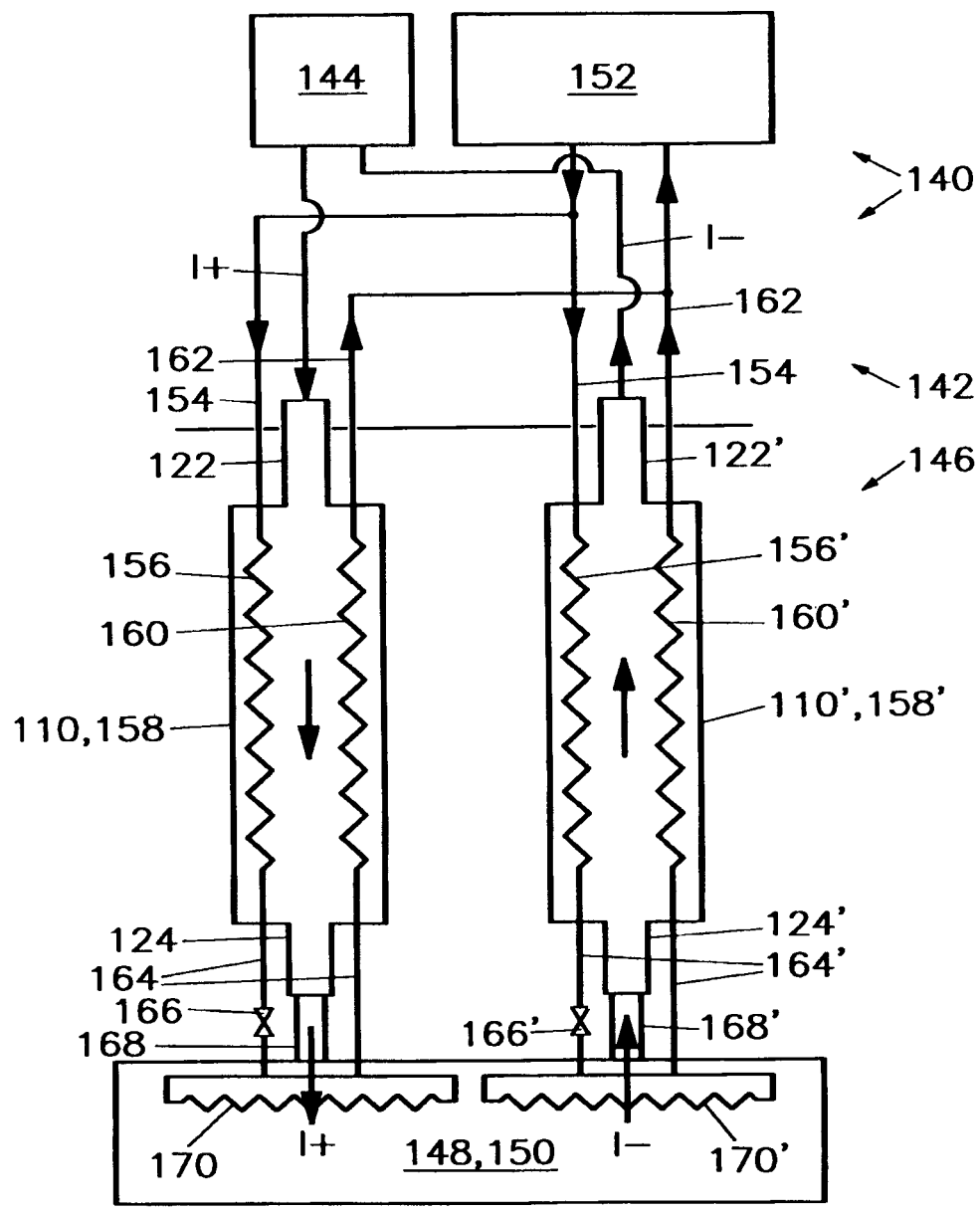

POWER SUPPLY AND METHOD FOR PRODUCTION THEREOF

FIELD OF THE INVENTION

The invention relates to a power supply and to a method for production thereof. The present invention further relates to a device comprising at least one such power supply for generation of cryogenic temperatures and for transport of electrical energy and to the use thereof, especially for cooling and for operation of high-temperature superconductors at a cryogenic temperature of 15 K to 90 K. However, other applications are possible.

PRIOR ART

Closed-circuit cooling to cryogenic temperatures of 15 K to 90 K is of high significance for many applications in energy technology, especially of power supplies for high-temperature superconducting applications. As set out in detail in T. Kochenburger, *Kryogene Gemischkältekreisläufe für Hochtemperatursupraleiter-Anwendungen* [*Cryogenic Mixed Refrigerant Circuits for High-Temperature Superconducting Applications*], doctoral thesis, Karlsruhe Institute of Technology, 2019, ISBN 978-3-8439-3987-4, preference is given to using cryogenic mixed refrigerant circuits for this purpose. By the Linde-Hampson cycle process in particular, it is possible to achieve cryogenic temperatures below 120 K. In this case, the desired cooling is achieved via the Joule-Thomson effect, which describes a change in temperature in the case of adiabatic isenthalpic expansion of a real fluid. In order for cooling to be achieved, the Joule-Thomson coefficient defined according to equation (1), $$\mu_{JT} = \left(\frac{\partial T}{\partial p}\right)_H, \quad (1)$$

where the term $$\left(\frac{\partial T}{\partial p}\right)_H$$

denotes a partial derivative of the temperature T with respect to pressure p at constant enthalpy H and hence expansion, has a positive value. This condition is met over a wide range of states of many fluids, or can be achieved by preliminary cooling of fluids. Since, even in the case of large pressure differentials, a reduction in temperature by more than 100 K is achievable only with low efficiency in practice, if at all, cryogenic temperatures below 120 K are achieved by pre-cooling the fluid by means of an internal countercurrent heat exchanger (recuperator) prior to expansion.

The Linde-Hampson cycle process commences in a compressor in which a fluid coolant is compressed to a high pressure, with release of any energy of compaction that arises here in a downstream cooler to an environment of the compressor. Subsequently, the coolant is cooled down in a countercurrent heat exchanger. In an expansion unit, preferably selected from an expansion valve, a throttle capillary, a diaphragm and a sinter element, the coolant expands adiabatically to a low pressure level and cools down further by means of the Joule-Thomson effect given a positive Joule-Thomson coefficient $\mu_{JT}$. Subsequently, it is possible to absorb a heat flow from an application to be cooled, especially the high-temperature superconductor, in an evaporator. Finally, the coolant is heated again to ambient temperature in the countercurrent heat exchanger, before flowing back to the compressor. If this cycle process is used to cool power supplies or for liquefaction of low-boiling fluids, for example hydrogen, a heat flow is also absorbed by the coolant within the countercurrent heat exchanger from the power supply or the fluid to be cooled.

In order to improve the efficiency of the Linde-Hampson cycle process, any resultant generation of entropy can be reduced by changes in the cycle process, for example use of multistage compressions, multistage heat exchangers or turbines for expansion. Alternatively or additionally, it is possible to alter thermodynamic properties of the coolant by adding at least one further coolant having a boiling point different than the coolant. In what is called a "cryogenic mixed refrigerant circuit", the Linde-Hampson cycle process is implemented not with a pure substance but with a multicomponent mixture having a wide boiling range as coolant, in which case the cycle process takes place predominantly in a biphasic region of the mixture. In the case that the cycle process is executed in the form of at least two cooling stages, each cooling stage may preferably have a dedicated multicomponent mixture having a wide boiling range, such that the cycle process in each cooling stage takes place predominantly in a biphasic region of the respective coolant mixture. As a result, the coolant mixture can reach its dew point even at the warm end of its cooling stage, for example close to ambient temperature in the first cooling stage, and is then gradually condensed during the cooling operation and sub-cooled further after passing the boiling point. The Joule-Thomson expansion thus takes place partly in subcooled form, partly with high liquid fractions. By choice of the composition of the coolant mixture of a cooling stage, it is possible here to control the effective heat capacity of the coolant streams of the cooling stage in question in the countercurrent heat exchanger by reducing the temperature differential to a minimum both between the coolant streams of the cooling stage, preferably relative to a coolant mixture in at least one further cooling stage or relative to a gas stream to be liquefied or cooled, preferably over the entire flow length of the countercurrent heat exchanger. A further feature may be the breakdown of the fluid into two liquid phases that occurs in some coolant mixtures. It is possible here to distinguish the two liquid phases in terms of polarity, level of fluorination or chain length of their components.

In order to achieve efficient cooling, it is possible to correspondingly adjust the thermodynamic properties of the coolant mixture used in a cooling stage. An efficient coolant mixture has a dew point which, at high pressure level, is close to the recooling temperature of the cooling stage in question. While the recooling temperature in the first cooling stage is typically in the region of ambient temperature, the recooling temperature of a cooling stage in multistage processes is in the region of the coolant temperature generated by the isenthalpic expansion of the upstream cooling stage. The dew point temperature of a cooling stage can be influenced especially via choice and fractions of higher-boiling components for the cooling stage in question. The boiling temperature of the coolant mixture in a cooling stage should preferably be just below the cooling temperature at the low pressure level, in order to minimize the generation of entropy by a high liquid fraction in the expansion in the expansion unit. The selection and fractions of lower-boiling components have a considerable influence here on the boiling temperature. In order to achieve the desired high efficiency in each case with the above-specified temperature ranges, the coolant mixture for a cooling stage thus comprises both higher-boiling components and lower-boiling components, as a result of which the coolant mixture for a cooling stage has a wide boiling range overall. In practice, the coolant mixture for the first stage may therefore preferably comprise about four to five coolants having higher boiling points and lower boiling points, preferably selected from hydrocarbons and fluorinated hydrocarbons that are mixed in a ratio matched to the intended use, and preferably fractions of low-boiling components, especially selected from oxygen, nitrogen, argon, neon, hydrogen and helium. The coolant mixture which is used for a further cooling stage, which is precooled by an upstream cooling stage, may in practice comprise about two to four coolants having higher and lower boiling points, preferably selected from oxygen, nitrogen, argon, neon, hydrogen and helium, which are mixed in a ratio matched to the intended use, where no components that can freeze out at temperatures in the cooling stage in question are selected in each case.

The use of a coolant mixture having a wide boiling range thus enables gradual partial condensation of the coolant mixture on the high pressure side of a countercurrent heat exchanger, while it gradually partially evaporates on the low pressure side of the countercurrent heat exchanger. By selection of the components for the coolant mixture and adjustment of their concentrations, advantageous matching of capacity flows on the high pressure side and on the low pressure side of the countercurrent heat exchanger is thus possible. Optimization of the composition of the coolant mixture is possible to such an extent that heat transfer over the entire temperature range can be effected at a minimal temperature differential $\Delta T$ between the streams of matter, which can achieve a considerable rise in efficiency.

For transfer of maximum power $\dot{Q}$ from the warm side to the cold side of the cooling stage, based on heat transfer kinetics according to equation (2), $$\dot{Q}=\alpha A \Delta T, \qquad (2)$$

where $\alpha$ is a coefficient of heat transfer, it is possible to infer that, on account of a minimal temperature differential $\Delta T$, a countercurrent heat exchanger having a very large transfer area A is preferred. It would therefore be advantageous to specify a countercurrent heat exchanger having a maximum transfer area A.

Additionally known from the prior art are power supplies that are used to transport electrical energy, especially in the form of an electrical current, from an energy source in a warm region of the cooling stage, especially at room temperature, to an application disposed in a cold region, especially at a cryogenic temperature of 15 K to 90 K. It is possible here, depending on the cooling method used, to implement a power supply in an offgas-cooled or power-cooled manner. In power-cooled power supplies, the cooling is generally effected only at the cold end in a simple but inefficient manner, especially by means of a cryogenic cooler or a low-boiling liquid. By means of use of multistage cooling, it is possible to increase the efficiency stepwise, but there is simultaneously a rise in technical complexity. Furthermore, further modes of cooling are known, especially using Peltier elements; see, for example, S. Yamaguchi, M. Emoto, T. Kawahara, M. Hamabe, H. Watanabe, Y. Ivanov, Jian Sun, N. Yamamoto, A. Iiyoshi, *A Proposal of Multi-stage current lead for reduction of heat leak*, Physics Procedia 27 (2012) 448-451.

E. Shabagin and S. Grohmann, *Development of 10 kA Current Leads Cooled by a Cryogenic Mixed-Refrigerant Cycle*, IOP Conf. Series: Materials Science and Engineering 502 (2019) 012138, doi:10.1088/1757-899X/502/1/012138, describe a multi-tube-in-tube countercurrent heat exchanger wound around a copper core having a length of more than 1.2 m. For cooling to a temperature level of about 80 K of a superconductor application, the cold end is additionally introduced into a cryogenic cooler or liquid nitrogen. A shorter connection to the cold end would result in a decrease in temperature that could lead to unwanted freezing of the coolant mixture.

Dmitri Goloubev, *Kühlung eines resistiven HTSL-Kurzschlussstrombegrenzers mit einer Gemisch-Joule-Thomson-Kaltemaschine* [*Cooling of a Resistive HTSL Short-Circuit Current Limiter with a Mixed Joule-Thomson Cooling Unit*], thesis, Technical University of Dresden, 2003, after the analysis and optimization of the power supplies to liquid nitrogen temperature level, is concerned mainly with the study of a mixed nitrogen cascade as coolant supply system for a resistive HTSL current limiter. The abstract suggests avoiding direct contact between the power supply and the mixed refrigerant stream including combustible components, and reducing pressure drops on the low pressure side of the mixture cooling unit. The optimal combination found is a relatively long power supply and a nitrogen cooling stream with a relatively low liquid content of about 15% at the cold end of the power supply.

D. Gomse, A. Reiner, G. Rabsch, T. Gietzelt, J. J. Brandner, S. Grohmann, *Micro-structured heat exchanger for cryogenic mixed refrigerant cycles*, IOP Conf. Series: Materials Science and Engineering 278 (2017) 012061, doi: 10.1088/1757-899X/278/1/012061, describe a microstructured countercurrent heat exchanger comprising 60 thin stainless steel plates bonded in the form of a stack by means of diffusion welding. By means of an etching method, in each case 50 parallel flow ducts having a channel width of 400 µm, a channel depth of 200 µm and a channel length of 20 cm have been introduced into each plate, with every two opposite plates arranged in such a way as to form round flow ducts having a diameter of 400 µm. In addition, each plate has four positioning holes for alignment of the plates and four cutout regions that form top lines.

DE 10 2016 011 311 A1 discloses a method of cooling a power supply for a consumer with cryogenic gas, wherein the power supply is designed as a plate heat exchanger and the cryogenic gas is guided through the plate heat exchanger as a coolant. What is also described is the construction of a gas-cooled power supply designed as a plate heat exchanger.

DE 10 2005 005 780 A1 discloses a power supply unit for a low-temperature conductor having at least one electrical conductor that has a warm contact site and a cold contact site connected to the low-temperature conductor, and having a coolant duct bounded by the conductor at least on one side. What is proposed is that the coolant duct has guide elements with which directed convection of the coolant in the coolant duct from the cold contact site to the warm contact site can be forced, and the speed of the coolant adjusted in a local manner.

DE 199 04 822 C1 discloses that, in a method, a cryogenic gas is guided as first coolant within a first circuit and that, with the aid of the cryogenic gas, the power supplies are or the consumer having power supplies is cooled directly, with guiding of the cryogenic gas in countercurrent to the incoming heat along the power supplies and with cooling of the first coolant with a second coolant, which second coolant is guided in a second, separate circuit.

DE 21 63 270 C discloses a power supply for electrical units having conductors cooled to cryogenic temperature, the end of which is connected to a normal conductor disposed in a gas stream of an evaporated cooling medium, wherein the gas stream of the evaporated cooling medium is divided into individual flows, each of which flows through a flow duct bounded by at least two walls of electrically insulating material, the separation of which is not more than 30 mm.

U.S. Pat. No. 4,992,623 A discloses an electronic system having components for low temperature at various points within the system, wherein cryogenic fluid and electrical power are distributed by means of the same conduit. The conduit consists of a feed section and a recycling section, with each section comprising a duct for conveying of the cryogenic fluid with superconductive walls for conveying of the electrical power. Alternatively, the conduit may comprise a copper bar with ducts formed therein for the transport of the cryogenic fluid and a duct to accommodate a bar of superconductive material. The superconductive bar conducts the electrical current to a subsystem while it is being cooled by the cryogenic fluid, with further use of the cryogenic fluid at its intended site for cooling purposes. Further in the alternative, cryogenic fluid can be transported by means of a pair of concentric conduits, in which case the walls of each conduit comprise superconductive material for simultaneous provision of electrical power to the subsystems that use the cryogenic fluid.

WO 2003/081104 A2 discloses a method of producing a jacket for a high-temperature multifilament superconductor cable. The jacket is produced by coextrusion of a cylindrical blank with at least two concentric cylinders. In addition, a shell is proposed for a high-temperature multifilament superconductor cable, which is produced by the method mentioned. The jacket consists of a tube with a multilayer wall comprising: a pure silver inner layer and at least one second silver-based alloy layer.

Proceeding from this, it is an object of the present invention to provide a power supply and a method of production thereof, and a device for generation of cryogenic temperatures and for transport of electrical energy and use thereof, which at least partly overcome the disadvantages detailed and limitations of the prior art.

In particular, by comparison with the prior art, significantly more compact and more efficient power supplies are to be provided, which permit dissipation of any power loss as directly as possible at that site where it can be converted to heat. It shall be possible here to dissipate the heat as far as possible at the highest possible temperature level in each case, in order to arrive thermodynamically at a rise in efficiency compared to the prior art, by which the power supply is cooled either solely at its cold end or with higher temperature differentials relative to a gas stream.

DISCLOSURE OF THE INVENTION

This object is achieved by a power supply and a method of production thereof, and by a device for generation of cryogenic temperatures and for transport of electrical energy and the use thereof according to the features of the independent claims. Advantageous embodiments that are implementable individually or in any combination are described in the dependent claims.

The words "have", "comprise" or "include" or any grammatical variants thereof are used hereinafter in a non-exclusive manner. Accordingly, these terms may relate both to situations in which no further features are present aside from the features introduced by these words, or to situations in which one or more further features are present. For example, the expression "A has B", "A comprises B" or "A includes B" may relate both to the situation in which, apart from B, no further element is present in A (i.e. to a situation in which A consists exclusively of B) and to the situation in which, in addition to B, one or more elements are present in A, for example element C, elements C and D or even further elements.

In addition, it is pointed out that the expressions "at least one" and "one or more" and grammatical variants of these expressions, when they are used in connection with one or more elements or features and are intended to express the fact that the element or feature may be provided once or more than once, are generally used only once, for example in the first introduction of the feature or element. In any subsequent new mention of the feature or element, the corresponding expression "at least one" or "one or more" is generally not used again, but this does not limit the possibility that the feature or element may be provided once or more than once.

In addition, the expressions "preferably", "especially", "for example" or similar expressions are used hereinafter in conjunction with optional features, without restriction of alternative embodiments thereby. For instance, features that are introduced by these expressions are optional features, and there is no intention by virtue of these features to restrict the scope of protection of the claims and especially of the independent claims. For instance, the invention, as the person skilled in the art will appreciate, can also be conducted using different configurations. In a similar manner, features that are introduced by "in one embodiment of the invention" or by "in one working example of the invention" are understood to be optional features without any restriction thereby of alternative configurations or the scope of protection of the independent claims. In addition, these introductory expressions shall have no effect on any of the options of combining the features introduced thereby with other features, whether they are optional or non-optional features.

In a first aspect, the present invention relates to a power supply for transport of electrical energy from an energy source to an application or from the application to the energy source, wherein the energy source is disposed in a warm region and wherein the application is disposed in a cold region, wherein the power supply has a stack comprising at least two foils, wherein each foil comprises an electrically conductive material configured to transport the electrical energy, wherein each foil has an electrical terminal configured to receive the electrical energy or to release the electrical energy, wherein each foil comprises a multitude of flow ducts for guiding a fluid stream.

The expression "power supply" here relates to a device configured for transport of electrical energy, especially in the form of an electrical current, from at least one energy source to at least one application or from the at least one application to the at least one energy source. In relation to the present invention, the power supply is especially configured to transport an electrical current from a normal circuit comprising the at least one energy source to a circuit comprising at least one superconductor, especially a high-temperature superconductor, preferably in order to enable further transport of the electrical current with minimum loss in the at least one superconductor, especially in the at least one high-temperature superconductor. However, other types of application are conceivable.

According to the invention, the energy source is in a warm region of a cooling stage of a device for generation of cryogenic temperatures, which can also be referred to as "cooling system", while the application is disposed in a cold region. In principle, each device for generation of cryogenic temperatures comprises at least one cooling stage which in each case has a cold region and a warm region. In this context, the "warm region" refers to a first subregion of the device that has a higher temperature compared to the cold region. In the case of at least two cooling stages, the device may be designed such that at least a portion of the warm region of the respective downstream cooling stage may correspond to the cold region of the respective upstream stage. Preferably, the warm region of the first cooling stage, also referred to as "preliminary cooling stage", is configured for ambient temperature and is typically kept at least at ambient temperature, although higher temperatures may also occur, especially in a compressor, for instance up to 150° C. The expression "ambient temperature" relates here to a temperature of 273 K, preferably of 288 K, more preferably of 293 K, up to 313 K, preferably to 303 K, more preferably to 298 K.

By contrast, the "cold region" refers to a further subregion of the cooling stage in question in the device which is configured for a cryogenic temperature and is intended to serve to generate the respective cryogenic temperature. The expression "cryogenic temperature" here embraces a temperature of 10 K, preferably of 15 K, up to 120 K, preferably to 90 K. Especially in order to bring the cold region to a cryogenic temperature and to keep it at a cryogenic temperature, the cold region is introduced into a cryostat, preferably a vacuum-insulated cryostat. However, the types of cryostat are possible.

According to the invention, the power supply has a stack comprising at least two foils. The term "foil" relates here to a thin extensive body of an electrically conductive material configured for transport of electrical energy. The foil may preferably have a surface in the form of a lateral extent comprising a foil length and a foil width, where the foil width may exceed a foil thickness perpendicular to the lateral extent by a factor of at least 10, preferably at least 25, more preferably at least 50, especially at least 100. The foil may preferably have a foil length of at least 5 cm, preferably of at least 10 cm, especially of 20 cm to 25 cm, up to at most 1 m, preferably to at most 50 cm;

a foil width of at least 2 cm, preferably of at least 5 cm, especially of 10 cm to 20 cm, at most up to 50 cm, preferably at most up to 25 cm; and a foil thickness of at least 200 μm, preferably of at least 250 μm, especially of 400 μm to 500 μm, at most up to 2 mm, preferably at most up to 1 mm.

Particularly for the choice of foil thickness, it should advantageously be noted that these, as elucidated in detail below, are bonded to one another by means of diffusion welding and are therefore configured in such a way that they can withstand any associated energy input without damage or even destruction. In principle, however, other values for foil length, foil width and foil thickness are also conceivable; however, it is particularly advantageous when the foil thickness does not exceed the stated value of 1 mm, over and above which it would have to be referred to as more of a "plate thickness".

The term "stack" relates to an arrangement comprising at least two foils that are each placed one on top of another parallel to their surfaces in the lateral extent and are preferably bonded to one another by means of diffusion welding. Especially in order to avoid any excess between adjacently arranged foils in the stack, all foils of the stack may preferably have the same foil length and the same foil thickness. In order, as elucidated in detail below, to enable maximum uniformity of distribution of the electrical current according to Kirchhoff's laws over a maximum number of foils in the stack, it is additionally possible for all foils in the stack preferably to have the same foil thickness. The stack may comprise at least two foils, preferably at least 10 foils, more preferably at least 25 foils, especially 50 to 60 foils, up to 250 foils, preferably to 200 foils, more preferably to 100 foils. However, a different value for the number of foils in the stack is possible. It is possible in this way to adjust especially the number, foil length, foil width and foil thickness of the foils to a magnitude of electrical energy to be transported by means of the power supply, especially an expected current.

As already mentioned, each foil comprises an electrically conductive material configured to transport electrical energy. A material is "electrically conductive" when it enables transport of electrical energy, especially of electrical charge carriers in the form of an electrical current, through the material. In a particularly preferred configuration, the electrically conductive material comprises a metal, especially a highly conductive metal having an electrical conductivity $\sigma$ of at least 106 S/m, preferably of at least $10^7$ S/m, preferably of at least $2 \cdot 10^7$ S/m. These metals especially include copper ($\sigma \approx 5.8 \cdot 10^7$ S/m), aluminum ($\sigma \approx \mathbf{3.7 \cdot 10^7}$ S/m) and brass ($\sigma \approx 2.4 \cdot 10^7$ S/m), with particular preference for copper and aluminum. Stainless steel is less preferred on account of its lower electrical conductivity $\sigma < 10^7$ S/m.

Furthermore, copper is particularly preferred over aluminum, since a power supply produced from copper foils has a specific surface area above 1000 $m^2/m^3$ up to 10 000 $m^2/m^3$, whereas the specific surface area for aluminum plates is only 100 $m^2/m^3$ up to 1000 $m^2/m^3$.

In order to enable reception of the electrical energy from the energy source and release of the electrical energy to the application, each foil has an electrical terminal. The expression "electrical terminal" relates here to a device on a foil which is configured for reception of electrical energy into the foil and/or for release of electrical energy from the foil. In particular, a dedicated electrical terminal is mounted on each transverse side of the foil, such that, therefore, it is possible for the electrical energy to be received from the energy source or for the electrical energy to be released to the energy source on one transverse side of the foil, and for the electrical energy to be released to the application or the electrical energy to be received from the application on the other transverse side of the foil. Preferably, the electrical terminal may be configured on at least one of the transverse sides, most preferably on both transverse sides, of the foil in the form of an electrically conductive terminal lug. The expression "terminal lug" in the context of the present invention refers in each case to an electrically conductive terminal part on the transverse side of the foil in question, which is preferably in a movable form, more preferably in a tapered and/or conically tapering form, where the terminal portion is preferably encompassed by the respective foil. In relation to the expression "electrically conductive", reference is made to the definition above. In an advantageous manner, it is thus possible to contact each foil in the stack individually in order thus to permit maximum homogeneity of distribution of the electrical current according to Kirchhoff's laws over a maximum number of foils in the stack. However, other modes of configuration of the electrical terminal are conceivable.

In a preferred configuration, the electrical terminal of the foil that faces the application in the cold region may have an electrically conductive connection to a high-temperature superconductor, with the high-temperature superconductor disposed between the electrical terminal of the power supply and the application. The high-temperature superconductor here may especially be configured as a strip or as a cable. In this way, the electrically conductive connection between the power supply and the application can be configured so as to be superconductive, especially in the form of a high-temperature superconductor, in order to enable further transport of the electrical current with minimum loss from the power supply to the application or from the application to the power supply. The term "high-temperature superconductor strip" refers here to an electrical conductor configured in strip form, at least partly comprising a high-temperature superconductor. The expression "high-temperature superconductor cable" refers here to an electrical conductor in cable form, which at least partly comprises a high-temperature superconductor. A high-temperature superconductor cable may comprise multiple filaments that may be connected in an electrically conductive manner individually or in groups to the foil, or to multiple foils.

According to the invention, each foil further comprises a multitude of flow ducts for guiding of a fluid stream. The fluid stream here may preferably be a coolant mixture or a gas stream to be cooled or a gas stream to be liquefied. The gas stream here may comprise a gas or any mixture of at least two gases, where the gas may be selected especially from oxygen, nitrogen, argon, neon, hydrogen and helium. As mentioned at the outset, the term "coolant mixture" refers to a mixture of at least two components of coolants, where at least two of the components have a different boiling temperature. In the context of the present invention, the term "coolant" in each case relates to a preferably inert fluid which has a positive Joule-Thomson coefficient $\mu_{JT}>0$ on entry into the cold region of the cooling stage in question, and which is thus suitable for use as a means of generating the cryogenic temperature in a cooling stage of the Linde-Hampson cycle process. In order to be able to achieve a high efficiency particularly in the case of cooling by the above-mentioned temperature range from about 300 K down to 15 K to 90 K, the coolant mixture for the respective cooling stage in each case comprises both higher-boiling components and lower-boiling components, as a result of which the coolant mixture can be described overall as "wide-boiling". Preferably, the coolant mixture for each cooling stage therefore comprises at least two, preferably at least three, more preferably at least four, up to eight, preferably up to six, preferably up to five, coolants, where at least one of the coolants is a higher-boiling component and at least one further coolant is a lower-boiling component. The term "higher-boiling" relates to fluids having a boiling point which is a temperature on entry into the cold region of the respective cooling stage. For the expression "cold region", reference is made to the above definition. The term "lower-boiling" relates to fluids having a boiling point which is a temperature below the temperature of the higher-boiling component in the respective cooling stage. The lowest-boiling component of the coolant mixture in the respective cooling stage has a boiling temperature which is below the temperature after the isenthalpic expansion of the respective cooling stage and may thus especially be a cryogenic temperature. For the expression "cryogenic temperature", reference is made to the above definition. Especially for the preliminary cooling stage, it is possible here for the at least one higher-boiling component preferably to be selected from a hydrocarbon and a fluorinated hydrocarbon, while the at least one lower-boiling component may preferably be selected from oxygen, nitrogen, argon, neon, hydrogen and helium. The coolant mixture for a further cooling stage which is precooled by a preceding preliminary cooling stage may preferably comprise a coolant selected from oxygen, nitrogen, argon, neon, hydrogen and helium, which are preferably mixed in a ratio matched to the intended application, preference being given to avoiding those components in each case that can freeze out at the temperatures in the cooling stage in question. Other types of coolant are possible.

As already mentioned, each foil comprises a multitude of flow ducts for guiding of the fluid stream. The expression "flow duct" here refers to an elongated depression introduced into the respective foil, which can especially extend over the entire foil length of the foil in question, especially minus at least one entry region and at least one exit region, and which is therefore configured to receive the fluid stream from a first region, selected from the warm region or the cold region of a cooling stage, to guide the fluid stream over the foil and to release the fluid stream to a second region, selected from the respective other region of the cooling stage in question. More preferably, it is possible here to choose the number, form and configuration of the flow ducts in such a way that the fluid stream flows in a laminar flow as far as possible through the multitude of flow ducts in the foils.

The multitude of flow ducts may preferably be introduced into the respective foil by means of a subtractive method, especially selected from an etching method or from microetching, as a result of which the foil in question may also be referred to as "microstructured foil". It is possible here for each flow duct in principle to have any duct cross section having an opening toward the surface of the foil. Especially when the etching method is used, as a result of the manufacture, a semicircular duct cross section is created, whereas other kinds of duct cross sections are possible in the case of microetching; however, manufacturing of the flow ducts by means of microetching is more time-consuming compared to the etching method.

Each foil here may comprise at least 10 flow ducts, preferably at least 20 flow ducts, more preferably at least 25 flow ducts, especially 50 to 100 flow ducts, to 500 flow ducts, preferably to 250 flow ducts, more preferably to 200 flow ducts. However, a different number of flow ducts in the foil is possible. Especially in order to simplify manufacture of the flow ducts, it is possible here for all flow ducts in one foil, preferably in each foil, to have preferably the same duct length, duct width, duct depth and land width, and to be arranged parallel to one another in periodic sequence in the foil, wherein the duct length may preferably correspond to the foil length of the corresponding foil, especially minus at least one entry region and at least one exit region;

the duct width may be at least 100 μm, preferably at least 250 μm, especially 400 μm to 500 μm, at most to 2 mm, preferably at most to 1 mm, where a land width by which adjacent flow ducts are removed from one another may be at least 0.5, preferably at least 1.0, especially from 1.0 to 2.0, at most 5.0, preferably at most 2.5, of the duct width of the flow ducts; and the duct depth may be at least 50 μm, preferably from at least 100 μm, especially from 200 μm to 250 μm, at most 1 mm, preferably at most 500 μm, but less than the foil thickness, preferably less than 75% of the foil thickness, more preferably less than 50% of the foil thickness, such that a sufficient floor thickness of the foil can remain, where a ratio of duct width to duct depth, especially in the case of use of an etching method, may preferably be from 1.0 to 3.0, especially about 2.0, while other values are possible when microetching is used. However, other values for duct length, duct width and duct depth of the flow ducts are conceivable.

As already mentioned above, it may also be advantageous to note that the foils are bonded to one another by means of diffusion welding and therefore especially have sufficient floor thickness and land width, such that the foils can withstand the associated energy input without damage or even destruction. In addition, diffusion welding has the advantage that, as a result, the stack of the foils comprises only a uniform material; in particular, it is possible as a result to dispense with any solder as further material in the stack. In this way, it is possible to provide a monolithic design with which thermal stresses that can lead to leaks during the operation of the power supplies can be effectively prevented.

Irrespective of the manner of configuration of the flow ducts, the flow ducts are preferably each introduced exclusively onto a single side of the surface of each foil. It is thus possible for adjacent foils, especially foils assigned to different flow pathways, to be introduced into the stack in such a way that the openings of flow ducts on the surface of the foils are arranged so as to face away from one another. It is thus possible to avoid any offset as described in Gomse et al., see above, between flow ducts of adjacent foils arranged so as to face one another. For further details of the arrangement of the foils in the stack, which can also be referred to as "stacking", reference is made to the working examples. In principle, however, any other arrangement of the flow ducts in individual or all foils is also conceivable, including an arrangement of the flow ducts on both sides of a foil, but this is generally associated with disadvantages, generally with an offset or higher manufacturing complexity.

The foils encompassed by the stack have
 a first flow pathway through the flow ducts which is configured to receive the coolant mixture at high pressure level from the warm region of the cooling stage; and
 a second flow pathway through the flow ducts which is configured to receive the coolant mixture at low pressure level from the cold region of the cooling stage, or to receive a liquid phase of the coolant mixture at low pressure level from the cold region of the cooling stage.

By contrast with the known prior art, the device is a countercurrent heat exchanger with a high pressure stream and low pressure stream of the cooling medium, wherein the high pressure stream flows from the warm region into the cold region in flow direction of the electrical current, while the low pressure stream flows in the opposite direction from the cold region into the warm region.

In addition, the foils encompassed by the stack may preferably have at least one further flow pathway selected from:
 a third flow pathway through the flow ducts which is configured to receive a vapor phase of the coolant mixture at low pressure level from the cold region of the cooling stage;
 a fourth flow pathway through the flow ducts which is configured to receive the gas stream to be cooled or the gas stream to be liquefied from the warm region of the cooling stage.

In this configuration, separate reception of a vapor phase and of a liquid phase of the coolant mixture is preferably possible.

In a preferred configuration, it is possible here for the flow ducts of each foil to be provided either as the first flow pathway for reception of the coolant mixture at high pressure level from the warm region, as the second or third flow pathway for reception of the coolant mixture at low pressure level from the cold region, or as the fourth flow pathway for reception of the gas stream to be cooled or liquefied from the warm region of the cooling stage. By adjusting the geometry of the flow ducts and/or a ratio of the number of foils comprising the first flow pathway to the number of foils comprising the second, third or fourth flow pathway, it is possible to adjust pressure drops and heat transfer areas in a simple manner.

In relation to a sequence of the arrangement of foils in the stack, the following configurations in particular may be preferred:
 The flow ducts of adjacently stacked foils in the stack may be embodied alternately as first flow pathway for reception of the coolant mixture at high pressure level and as second flow pathway for reception of the coolant mixture at low pressure level.
 The flow ducts of at most two adjacently stacked foils in the stack may be embodied as first flow pathway for reception of the coolant mixture at high pressure level, while a further foil adjoining these in each case has second or third flow pathways for reception of the coolant mixture at low pressure level.
 The flow ducts of at most two adjacently stacked foils in the stack may be embodied as second or third flow pathway for reception of the coolant mixture at low pressure level, while a further foil adjoining these in each case has flow ducts in the first flow pathway for reception of the coolant mixture at high pressure level or in the fourth flow pathway for reception of the gas stream to be cooled or liquefied from the warm region of the cooling stage.
 The flow ducts of at most two adjacently stacked foils in the stack may be embodied as fourth flow pathway for reception of the gas stream to be cooled or liquefied from the warm region of the cooling stage, while an adjoining further foil has flow ducts in the first flow pathway for reception of the coolant mixture at high pressure level, or in the second or third flow pathway for reception of the coolant mixture at low pressure level.

However, further configurations of the arrangement of the foils in the stack are possible. Such a layered setup or a setup that alternates at intervals for the first and second flow pathways, and optionally for the third flow pathways and/or the fourth flow pathways, can thus achieve countercurrent flow through the stack.

Each foil has an entry region and exit region for the flow ducts, with the "entry region" referring to a first section of the foil that adjoins a first region of the flow ducts and is configured for entry of the fluid stream into the flow ducts, while the "exit region" refers to a second section of the foil that adjoins a second region of the flow ducts and is configured for exit of the fluid stream from the flow ducts. In a preferred configuration, the entry region and/or the exit region may have a distributor element configured to divide the fluid stream between the flow ducts of the foil that are preferably arranged in parallel. Especially for achievement of an equal distribution of the fluid stream between the flow ducts, the distributor element may preferably have a multitude of periodically arranged elevations and depressions in between. The elevations here may preferably assume the same level as the surface of the foil, while the depressions may preferably have the same duct depth as the flow ducts. The distributor elements may advantageously especially serve to prevent incorrect distribution of the flow in operation during the distribution of the fluid stream between multiple parallel flow ducts. The distributor element may be introduced together with the introduction of the flow ducts into the foil.

In a preferred configuration of the present invention, one side, preferably both sides, of the stack may be provided with a cover plate. It is possible here for at least one of the cover plates to have at least one feed for supply of the fluid stream into the flow ducts of the stack, and a drain for removal of the fluid stream from the flow ducts of the stack. For production of the feed and/or the drain, the cover plate, before use in the power supply, may at first have solely corresponding ports at which the feed and/or the drain are secured. It is preferably possible here to use a hard solder bond to a pipe section and a subsequent pipe connection, especially by means of compression ring seals or clamp ring seals, or a weld bond.

In a further aspect, the present invention relates to a device for generation of cryogenic temperatures and for transport of electrical energy from an energy source to an application or from the application to the energy source, comprising at least one cooling stage having a warm region and a cold region, wherein a coolant mixture respectively configured for the cooling stage and an energy source are provided in the warm region, wherein the coolant mixture includes at least two components having different boiling temperatures, wherein the cold region of at least one cooling stage comprises the following:

- at least one power supply as described above or below, wherein the power supply has at least one first flow pathway for reception of the coolant mixture at high pressure level from the warm region of the cooling stage and at least one second flow pathway for reception of the coolant mixture at low pressure level from the cold region of the cooling stage, where the at least one power supply is simultaneously embodied as first heat exchanger;
- at least one expansion unit configured for expansion and for cooling of the coolant mixture to low pressure level; and
- the application which is configured to receive the electrical energy and/or to release the electrical energy.

It is preferably possible here for the cold region of at least one cooling stage which is configured for a cryogenic temperature and is intended to serve to generate the cryogenic temperature to be introduced into a cryostat, especially into a vacuum-insulated cryostat.

First of all, the cold region of the cooling stage in question comprises at least one power supply described in detail above or below, which is simultaneously configured as first heat exchanger, which is especially designed as a countercurrent heat exchanger. The term "heat exchanger" refers to a unit of any configuration which is configured to bring about transfer of thermal energy from at least one high-pressure stream of matter to at least one low-pressure stream of matter. The term "thermal energy" relates here to an energy in the respective stream of matter that can be described essentially as a function of the temperature of the stream of matter in question. In the context of the present invention, both the at least one high-pressure stream of matter and the at least one low-pressure stream of matter comprise the coolant mixture here for the respective cooling stage, where the streams of matter differ from one another in a temperature of the coolant mixture(s). In addition, the at least one high-pressure stream of matter may comprise a gas stream to be cooled or a gas stream to be liquefied. The at least one low-pressure stream of matter at the lowest level has in each case a lowest temperature in each section of the heat exchanger, followed by the temperature of the at least one low-pressure stream of matter of an optional upstream stage for precooling. The at least one high-pressure stream of matter has a temperature above that of the at least one low-pressure stream of matter in each section of the heat exchanger. Moreover, the term "countercurrent heat exchanger" relates to a particular type of heat exchanger in which the high-pressure stream of matter assumes an opposite direction to the direction of the low-pressure stream of matter. It is thus advantageously possible for a particularly cold stream of matter to meet a particularly warm stream of matter, by means of which a transfer of thermal energy from the at least one high-pressure stream of matter to the at least one low-pressure stream of matter can be made with maximum efficiency.

The first heat exchanger encompassed in accordance with the invention by the cold region of the cooling stage in question accordingly has a first subregion referred to as "high pressure side" and a second subregion referred to as "low pressure side", with the high pressure side configured to receive the coolant mixture and optionally the gas stream from the warm region of the cooling stage in question, and the low pressure side configured to release the coolant mixture into the warm region of the cooling stage in question. The coolant mixture fed to the high pressure side from the associated warm region thus has a higher temperature compared to the coolant mixture provided on the low pressure side for release to the associated warm region. Consequently, the coolant mixture provided on the low pressure side makes a significant contribution to cooling of the coolant mixture supplied on the high pressure side from the associated warm region and of the optionally supplied gas stream, and the transfer of thermal energy through the countercurrent heat exchanger used with preference can be made more efficient. In addition to the thermal energy from the high pressure side of the stage in question, the coolant mixture on the low pressure side of the stage in question can absorb thermal energy from further streams of matter, for example from the high pressure side of a downstream cooling stage or from the cooling or liquefaction of a gas stream to be cooled or liquefied.

The coolant mixture enters the first heat exchanger at high pressure level on the high pressure side, while the coolant mixture is provided at low pressure level on the low pressure side. The expression "high pressure level" refers here to a pressure level to which the attendant coolant mixture is subjected, the pressure of which has a value exceeding the pressure value to which the coolant mixture provided on the low pressure side is subjected. In particular, the high pressure level of the cooling stage here may have an absolute pressure of 1 bar, preferably of 10 bar, more preferably of 25 bar, up to 150 bar, preferably to 25 bar, more preferably to 20 bar, while the low pressure level of the cooling stage may have an absolute pressure of 100 mbar, preferably of 1 bar, more preferably of 2 bar, up to 50 bar, preferably to 10 bar, more preferably to 5 bar. However, other values both for the high pressure level and for the low pressure level are possible, especially depending on the coolant mixture used for the respective cooling stage.

In addition, the cold region of the cooling stage in question comprises at least one expansion unit configured for expansion and cooling of the coolant mixture to the low pressure level. It is possible here to achieve the desired cooling of the coolant mixture preferably via the Joule-Thomson effect, with the Joule-Thomson coefficient $\mu_{JT}$ of the coolant mixture defined according to equation (1) assuming a positive value. The effect of the at least one expansion unit thus firstly is the reduction in the pressure to which the coolant mixture is subjected from the high pressure level to the low pressure level, and secondly the desired further cooling of the coolant mixture. The at least one expansion unit here may preferably be selected from an expansion valve, a throttle capillary, a diaphragm and a sintered body. However, use of a different expansion unit is conceivable.

Furthermore, the cold region of the at least one cooling stage may preferably comprise at least one second heat exchanger configured to cool the application, preferably the superconductor application, disposed in the cold region.

In a further aspect, the present invention relates to a method of producing a power supply, especially a power supply as described above or below, which is configured to transport electrical energy from an energy source to an application or from the application to the energy source, wherein the energy source is disposed in a warm region and wherein the application is disposed in a cold region, wherein the method comprises the following steps:

a) providing at least two foils, wherein each foil comprises an electrically conductive material configured to transport electrical energy, wherein each foil at each end has an electrical terminal configured to receive electrical energy from an energy source or to release the electrical energy to an application;

b) introducing a multitude of flow ducts configured to receive a fluid stream into the at least two foils;

c) arranging the at least two foils in the form of a stack and diffusion welding the at least two foils, wherein the electrical terminal of each foil in the cold region remains unwelded.

The multitude of flow ducts can be introduced here into the at least two foils in step b) preferably by means of an etching method or by means of microetching. As mentioned above, the fluid stream may preferably comprise a coolant mixture or a gas stream to be cooled or a gas stream to be liquefied.

While the electrical terminals of the foils in the warm region can be welded to one another, by contrast, the electrical terminals of the foils in the cold region remain unwelded, so that the high-temperature superconductor, as mentioned above, can be contacted individually in an advantageous manner.

The arranging of the at least two foils in the form of a stack in step c) here may preferably comprise the respective mounting of at least one cover plate on at least one side of the stack, preferably of a cover plate on each side of the stack, wherein the diffusion welding of the at least two foils also comprises the at least one cover plate, preferably the two cover plates, wherein the method may include the further step of:

d) in each case introducing at least one feed configured to feed in the fluid stream, and at least one drain configured to drain off the fluid stream into at least one of the cover plates.

Furthermore, the present method may preferably have the following further step:

e) placing at least one high-temperature superconductor onto the electrical terminal of the foils at the cold end configured to release the electrical energy to the application.

The high-temperature superconductor may especially be configured here as a strip or as a cable.

For further details in relation to the present method and the terms used here, reference is made to the description of the power supply of the invention.

In a further aspect, the present invention relates to a use of a device for generation of cryogenic temperatures and for transport of electrical energy for cooling and for operation of high-temperature superconductors at a temperature of 15 K to 90 K.

For further details in relation to the present use, reference is made to the description of the device of the invention.

The power supply of the invention, the method for production thereof and the device for generation of cryogenic temperatures and for transport of electrical energy from an energy source and the use thereof have a number of advantages over known power supplies, accompanying methods and corresponding devices. The power supply proposed herein, as a uniform component, takes on a twin function that simultaneously comprises a power supply and a heat transfer. Especially compared to the prior art, it is thus possible to provide significantly more compact and more efficient power supplies that permit removal of any resultant loss of power directly at that site where it can be converted to heat. It is possible here to remove the heat at the highest possible temperature level in each case, such that a rise in efficiency occurs compared to exclusive cooling at the cold end of the power supply, stepwise cooling or cooling by a gas stream.

BRIEF DESCRIPTION OF THE FIGURES

Further details and features of the present invention will be apparent from the description of preferred working examples that follows, especially in conjunction with the dependent claims. It is possible here for the respective features to be implemented on their own, or two or more in combination. However, the invention is not limited to the working examples. The working examples are shown schematically in the figures that follow. In this context, identical reference numerals in the figures denote elements that are the same or have the same function, or elements that correspond to one another in terms of their function.

The individual figures show:

FIG. 1 schematic diagrams of preferred working examples of a power supply of the invention;

DESCRIPTION OF THE WORKING EXAMPLES

Figure 2A:
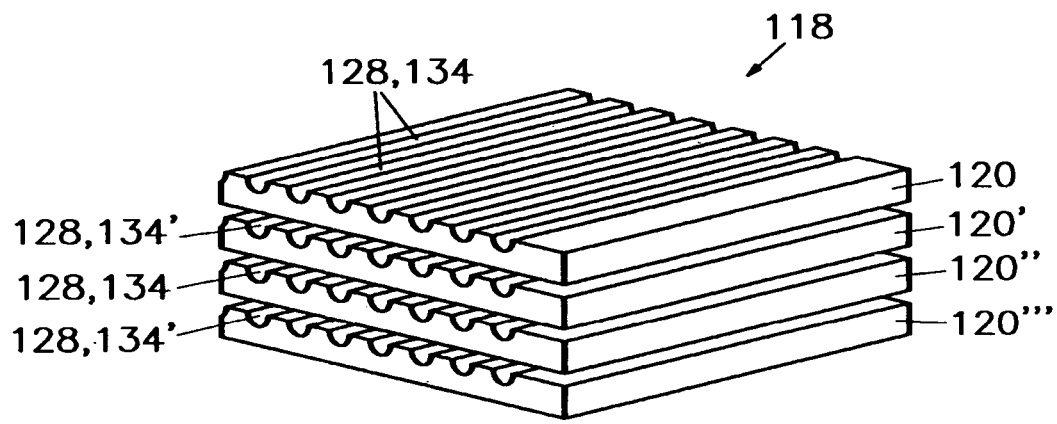
FIG. 2 schematic diagrams of preferred working examples of an arrangement of foils within a stack in a power supply of the invention.

FIGS. 1a and 1b each show a schematic diagram of a preferred working example of an inventive power supply 110 in the form of an exploded diagram. Drawn here in each case between an upper cover plate 112 having four ports 114, 114', 114", 114''' provided for connection of a feed and/or a drain for a coolant mixture, and a lower cover plate 116 are a stack 118 comprising a multitude of foils 120, and two individual foils 120', 120" (FIG. 1a) or three individual foils 120', 120", 120''' that are likewise configured for incorporation into the stack 118.

As apparent from FIGS. 1a and 1b, the foils 120 are each placed one on top of another parallel to their surfaces in the lateral extent and can preferably be bonded to one another by means of diffusion welding. In particular, all foils 120 of the stack 118 may preferably have the same foil length and the same foil width, in order to avoid any excess between adjacently arranged foils 120 in the stack 118. In order, moreover, to distribute a flow of electrical energy with maximum uniformity over a maximum number of foils 120 in the stack 118, it is additionally possible for all foils 120 in the stack 118 preferably to have the same foil thickness. It is preferably possible to adjust the number, foil length, foil width and foil thickness of the foils 120 to a level of the electrical energy to be transported by means of the power supply 110. As mentioned above, the stack 118 may especially comprise 10 to 100 foils 120; however, another value for the number of foils 120 in the stack 118 is possible.

Each foil 120, 120', 120", 120''' has an electrically conductive material configured to transport electrical energy. With regard to the expression "electrically conductive", reference is made to the definition above. For this purpose, the electrically conductive material preferably comprises copper, although other electrically conductive materials are likewise conceivable, and a dedicated electrical terminal on each transverse side of each foil 120, 120', 120", 120'''. As shown by FIGS. 1a and 1b, a first transverse side of each foil 120, 120', 120", 120''' may in each case have a first electrical terminal 122, 122', 122", 122''' for reception of the electrical energy from an energy source and the other transverse side of the foil 120, 120', 120", 120''' may in each case have a second electrical terminal 124, 124', 124", 124''' for release of the electrical energy to an application to be cooled, which is configured to receive the electrical energy thus provided, where each first electrical terminal 122, 122', 122", 122''' and each second electrical terminal 124, 124', 124", 124''' is encompassed by the foil in question.

As is also shown in FIGS. 1a and 1b, the electrical terminals may each be configured in the form of an electrically conductive terminal lug, such that both the first electrical terminal 122, 122', 122", 122''' and the second electrical terminal 124, 124', 124", 124''' of each foil 120, 120', 120", 120''' has an electrically conductive terminal part which is preferably movable and has an at least partly tapering configuration compared to the rest of the body of the foil 120, 120', 120", 120'''. However, other modes of arrangement and of configuration of the electrical terminals of the foils 120, 120', 120", 120''' are conceivable.

As is particularly readily apparent in the illustrative foils 120', 120" from the diagram in FIGS. 1a and 1b, each foil 120, 120', 120", 120''' has a passage 126, 126', 126", 126''' disposed beneath the four ports 114, 114', 114", 114''' of the upper cover plate 112 which is configured for feeding and/or for draining the coolant mixture in each individual foil 120, 120', 120", 120'''. Both between the passages 126' and 126''' in the foil 120' and between the passages 126 and 126" in the foil 120", a multitude of flow ducts 128 preferably arranged in parallel and preferably a multitude of periodically arranged depressions and elevations in between for guiding of a coolant mixture over the lateral extent of the surface along the foil length of the foil 120, 120', 120", 120''' is introduced into each foil 120, 120', 120", 120'''. For details of the arrangement and configuration of the flow ducts 128, reference is made to the above description and to the representation in FIGS. 2a and 2b.

As also shown in FIGS. 1a and 1b, between the passages 126' and 126''' and between the passages 126 and 126" and the respective accompanying multitude of flow ducts 128, there is in each case an entry region 130 and an exit region 130' for the flow ducts 128, with the choice of arrangement of the entry region 130 and of the exit region 130' in the foils 120, 120', 120", 120''' depending on a flow direction of the coolant mixture through the multitude of flow ducts 128 chosen in operation of the power supply 110. In the diagram according to FIGS. 1a and 1b, both the entry region 130 and the exit region 130' each have a distributor element 132, 132' configured for division, preferably uniform division, of the coolant mixture provided by at least one of the passages 126, 126', 126", 126''' between the flow ducts 128 of the foil 120, 120', 120", 120'''. For details in relation to arrangement and configuration of the distributor elements 132, 132', reference is made to the above description and to the representation in FIGS. 3a and 3b.

Figure 2B:
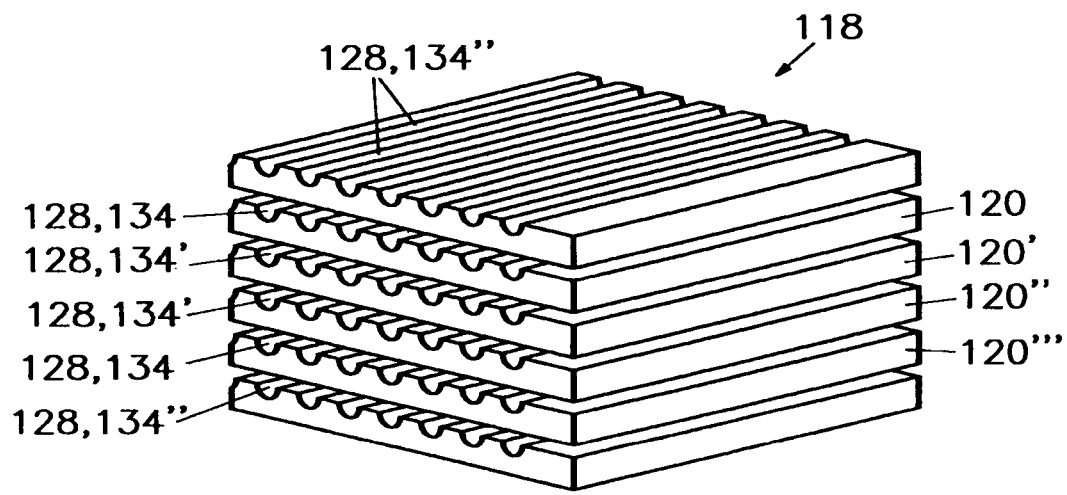

FIGS. 2a and 2b show schematic diagrams of preferred working examples of an arrangement of the foils 120, 120', 120", 120''' and of the flow ducts 128 within a stack 118 in the inventive power supply 110. As shown therein, the foils 120, 120', 120", 120''' encompassed by the stack 118 preferably comprise a first flow pathway 134 configured to receive the coolant mixture at high pressure level from a warm region of a cooling stage, and a second flow pathway 134' configured to receive the coolant mixture at low pressure level from a cold region of the cooling stage.

FIG. 2a shows a schematic of a first preferred sequence of the arrangement of the foils 120, 120', 120", 120''' in the stack 118. In this arrangement, the flow ducts 128 of adjacently stacked foils 120, 120" or 120', 120''' in the stack 118 are alternately embodied as first flow pathway 134 and as second flow pathway 134'.

FIG. 2b shows a schematic of a further preferred sequence of the arrangement of the foils 120, 120', 120", 120''' in the stack 118. In this alternative arrangement, the flow ducts 128 of two adjacently stacked foils 120', 120" in the stack 118 are embodied as second flow pathway 134' and as third flow pathway 134" for separate reception of a vapor phase and of a liquid phase of the coolant mixture at low pressure level, while a respective adjoining further foil 120, 120''' has a first flow pathway 134 for reception of the coolant mixture at high pressure level range. Adjoining that, the stack 118 may be further configured correspondingly or may continue according to the working example from FIG. 2a.

In a further preferred sequence of arrangement of the foils 120, 120', 120", 120''' in the stack 118 (not shown), the flow ducts 128 of two adjacently stacked foils 120', 120" in the stack 118 may be embodied as first flow pathway 134 for reception of the coolant mixture at high pressure level, while a respective adjoining further foil 120, 120''' may have a second flow pathway 134' for reception of the coolant mixture at low pressure level. In addition, further configurations of the arrangement of the foils 120, 120', 120", 120''' in the stack 118 are conceivable.

Figure 3A:
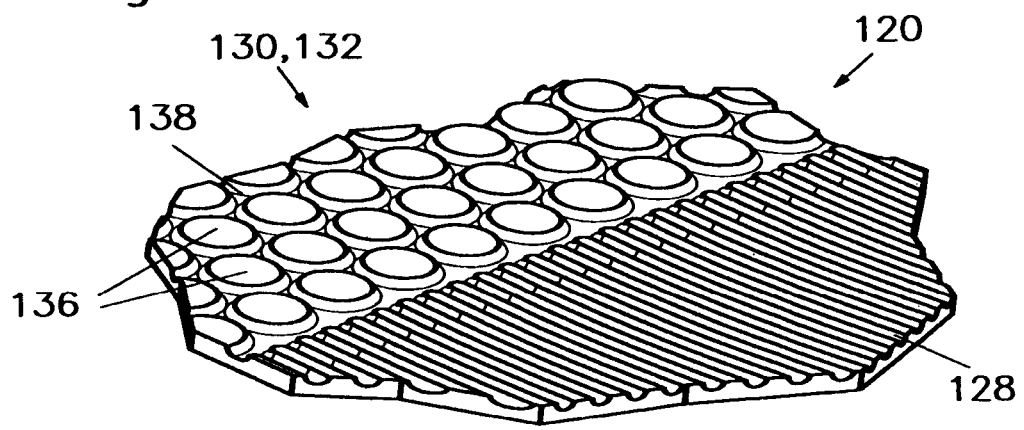
FIG. 3 schematic diagrams of a preferred working example of a distributor element in an entry region or exit region for division of a coolant mixture between flow ducts in one of the foils of the power supply of the invention.
Figure 3B:
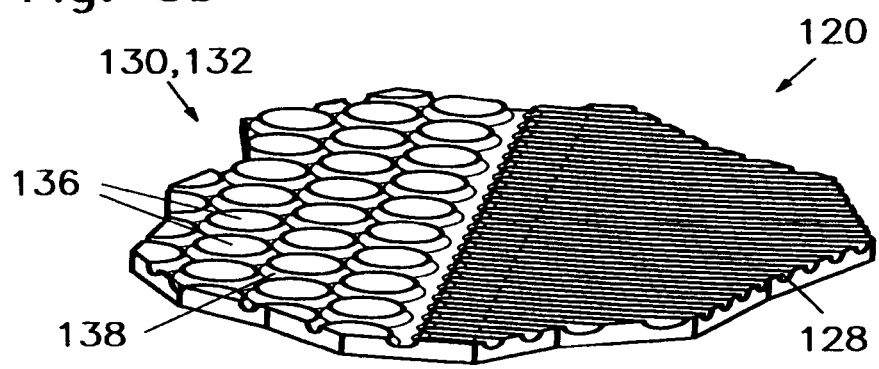
Figure 3C:
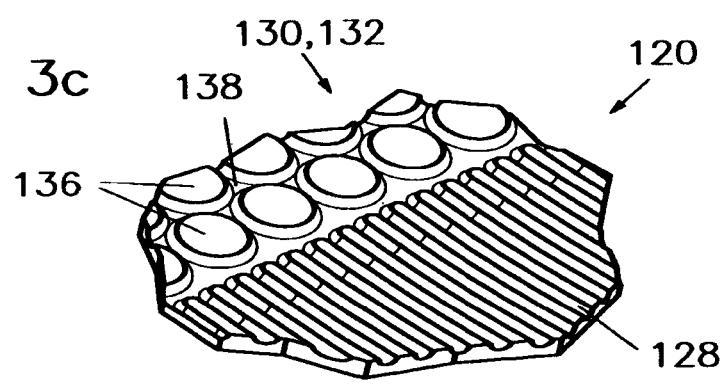

FIGS. 3a to 3c show schematic diagrams of a preferred working example for the distributor element 132 in the entry region 130 or in the exit region 130' for division of a coolant mixture between the flow ducts 128 in one of the foils 120 of the inventive power supply 110. Especially for achievement of an equal distribution of the coolant mixture in the entry region 130 between the flow ducts 128 in the foil 120, the distributor element 132, as shown, may preferably have a multitude of periodically arranged elevations 136 and depressions 138 in between. Preferably, the elevations 136 here may assume the same level as the surface of the foil 120, while the depressions 138 may preferably have the same duct depth as the flow ducts 128. The distributor elements 132, 132' may advantageously serve especially to prevent incorrect distribution of the flow in operation during the distribution of the flow between multiple parallel flow ducts 128.

Figure 4A:
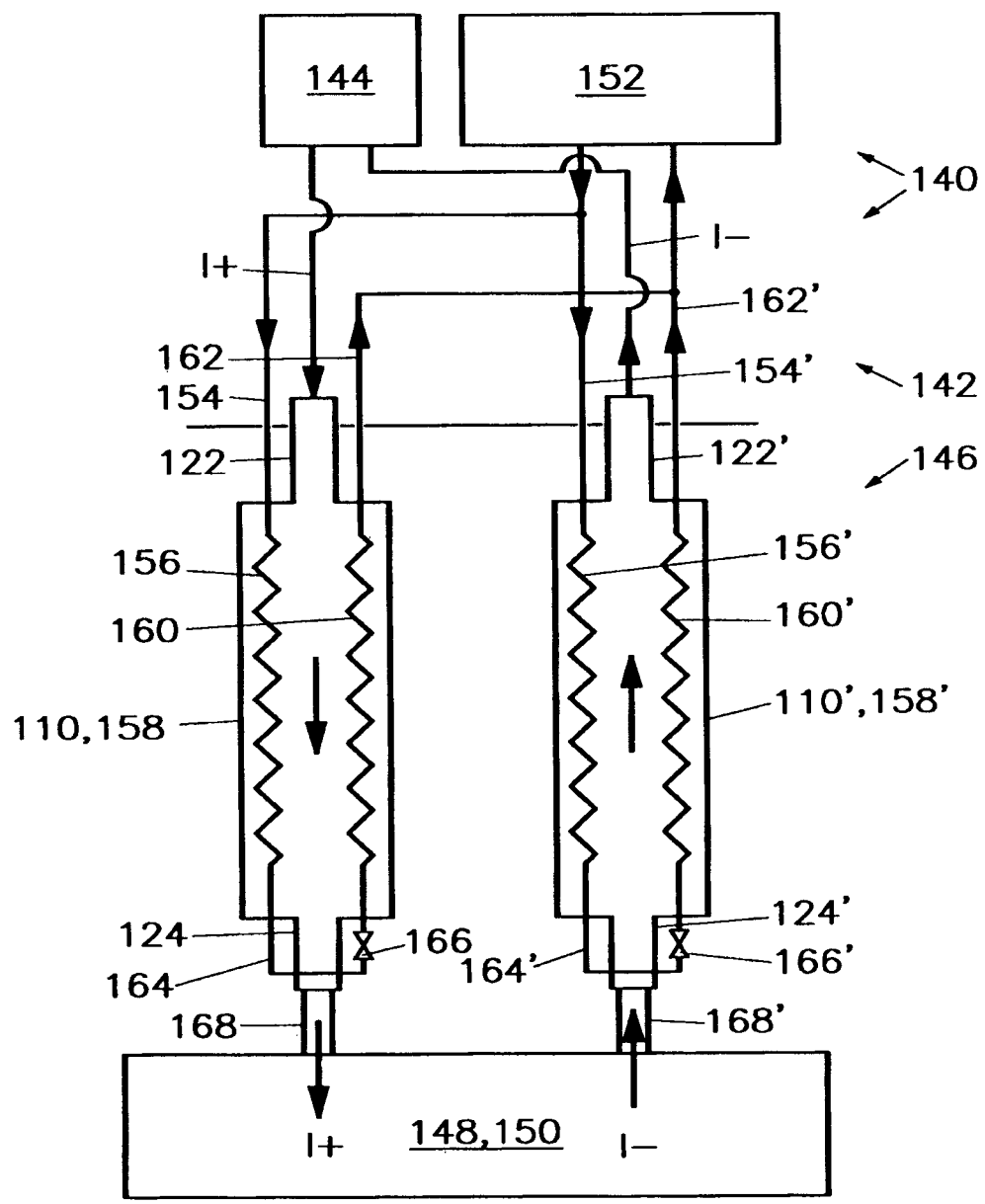
FIG. 4 schematic diagrams of preferred working examples of a one-stage device for generation of cryogenic temperatures and for transport of electrical energy, wherein the device comprises power supplies according to the invention.
Figure 4C:
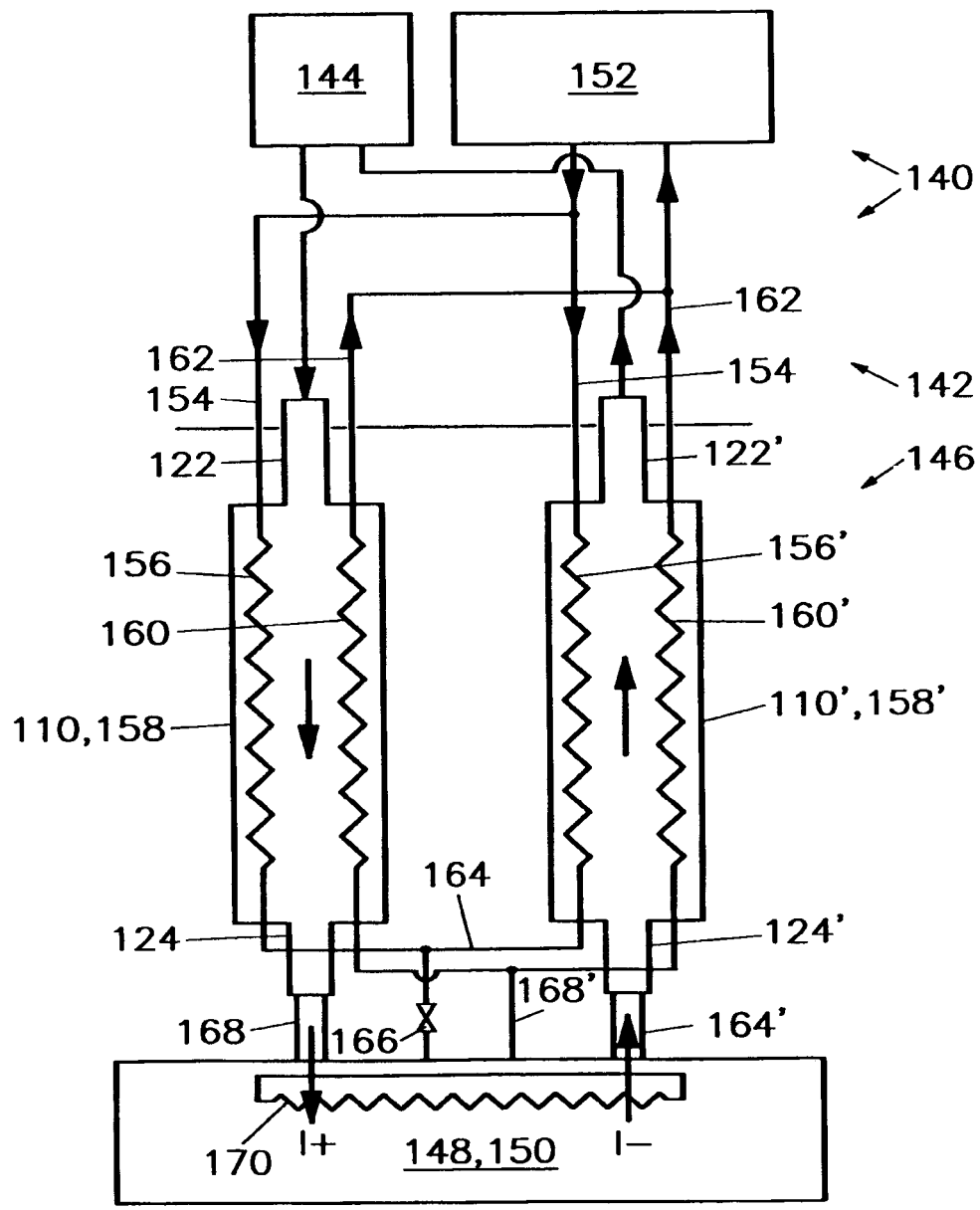

FIGS. 4a to 4c each show a schematic diagram of a preferred working example of a one-stage device 140 for generation of cryogenic temperatures and for transport of electrical energy from an energy source 142 disposed in a warm region 142 of the device 140 to an application 148 installed in a cold region 146 of the device 140, which especially has at least one high-temperature superconductor 150 or a component comprising at least one high-temperature superconductor 150. While the warm region 142 is preferably configured for ambient temperature and is typically kept at ambient temperature, there is typically a cryogenic temperature in the cold region 146 during the operation of the device 140. Reference is made to the above definitions for the terms "ambient temperature" and "cryogenic temperature".

In the warm region 142, a cooler 152 provides a coolant mixture comprising a mixture of at least two components of coolants that has been configured for the device 140, where at least two of the components have a different boiling temperature. In order to be able to achieve maximum efficiency in cooling of the coolant mixture from the ambient temperature to the cryogenic temperature, a wide-boiling coolant mixture is used that comprises both at least one higher-boiling component and at least one lower-boiling component. As mentioned above, the at least one higher-boiling component may preferably be selected from a hydrocarbon and a fluorinated hydrocarbon, while the at least one lower-boiling component may preferably be selected from oxygen, nitrogen, argon, neon, hydrogen and helium. However, other substances are possible.

As shown in FIGS. 4a to 4c, the present device 140 comprises two power supplies 110, 110' disposed in the cold region 146, as more particularly described above for FIGS. 1 to 3c. The introduction of the warm coolant mixture from the warm region 142 into the cold region 146 is effected at high pressure level by means of at least one feed 154, 154' in each case that opens in each case into a high pressure side 156, 156' of the power supplies 110, 110' that are each embodied simultaneously as first heat exchanger 158, 158', which, in the illustrative diagram according to FIGS. 4a to 4c, are designed as countercurrent heat exchangers. In addition, each respective first heat exchanger 158, 158' has a low pressure side 160, 160' designed for release of the cold coolant mixture to the warm region 142, in each case by means of a drain 162, 162'. Thus, the warm coolant mixture fed in from the warm region 142 on each high pressure side 156, 156' has a higher temperature compared to the coolant mixture provided on each low pressure side 160, 160' for release to the warm region 142. Consequently, the cold coolant mixture provided on each low pressure side 160, 160' makes a significant contribution to the cooling of the warm coolant mixture fed in from the warm region 142 on each high pressure side 156, 156', and a transfer of thermal energy through the countercurrent heat exchanger can be made more efficient in that the warm coolant mixture on each high pressure side 156, 156' from the warm region 124 flows in an opposite direction to a direction of the cold coolant mixture provided on each low pressure side 160, 160'.

The coolant mixture originally fed in from the warm region 142, which has already been partly cooled on each high pressure side 156, 156' in each first heat exchanger 158, 158', subsequently passes through a respective further conduit 164, 164' into a respective expansion unit 166, 166', designed here as an expansion valve. However, an alternative design of the expansion unit 166, 166' as throttle capillary, diaphragm or sinter element is possible. The expansion unit 166, 166' is likewise in the cold region 146 and is configured for cooling of the coolant mixture to low pressure level. The expansion unit 166, 166' may preferably be configured here to achieve the desired cooling of the coolant mixture by means of the Joule-Thomson effect, since the coolant mixture has been adjusted such that the Joule-Thomson coefficient $\mu_{JT}$ of the coolant mixture defined according to equation (1) has a positive value at the temperature of the cold side 146 of the device 146. Thus, the effect of the expansion unit 166, 166' is firstly the decrease in the pressure to which the coolant mixture is subjected from the high pressure level to the low pressure level, and secondly the desired further cooling of the coolant mixture.

As already mentioned above in connection with FIGS. 1a and 1b, the power supply 110 comprises the first electrical terminal 122 for reception of electrical energy in the form of a current I+ from the energy source 144 and the second electrical terminal 124 for release of electrical energy in the form of the current I+ to the application 148 which is configured to receive the electrical energy thus provided. In the preferred execution according to FIGS. 4a to 4c, the second electrical terminal 124 of the power supply 110 that faces the application 148 in the cold region 146 is connected in an electrically conductive manner to a high-temperature superconductor 168. The high-temperature superconductor 168 is advantageously disposed here between the second electrical terminal 124 of the power supply 110 and the application 148, such that, in this way, further transport of the electrical energy from the power supply 110 to the application 148 with minimum loss is enabled. The high-temperature superconductor 168 may especially be configured here as a strip or as a cable.

In order ultimately to obtain a closed circuit, in an analogous manner, the electrical energy is transported further with minimum loss in the form of a current I− from the application 148 to the power supply 110' via a corresponding high-temperature superconductor 168', which is connected in an electrically conductive manner to the second electrical terminal 124' of the power supply 110' that faces the application 148 in the cold region 146. In addition, the power supply 110' comprises the first electrical terminal 122' which is configured for release of the electrical energy in the form of the current I− from the application 148 via the power supply 110' to the energy source 144.

Compared to the working example according to FIG. 4a, the working example of the device 140 according to FIG. 4b has two second heat exchangers 170, 170' that are each configured for cooling of the application 148 in the cold region 146. As shown by FIG. 4b, for this purpose, the coolant mixture that has already been partly cooled in each first heat exchanger 158, 158' on each high pressure side 156, 156' passes via the respective further conduit 164, 164' and the respective expansion unit 166, 166' to the respective second heat exchanger 170, 170'.

Compared to the working example according to FIG. 4b, the working example of the device 140 according to FIG. 4c has a single second heat exchanger 170 configured for cooling of the application 148 disposed in the cold region 146. For this purpose, the coolant mixtures that have already been partly cooled in each first heat exchanger 158, 158' on each high pressure side 156, 156' are combined via the partly shared further conduit 164 and guided via the sole expansion unit 166 to the sole second heat exchanger 170. In an analogous manner, the coolant mixture from the sole second heat exchanger 170 is divided between the two low pressure sides 160, 160' of the first heat exchangers 158, 158' and hence fed back to the warm region 142.

Figure 5A:
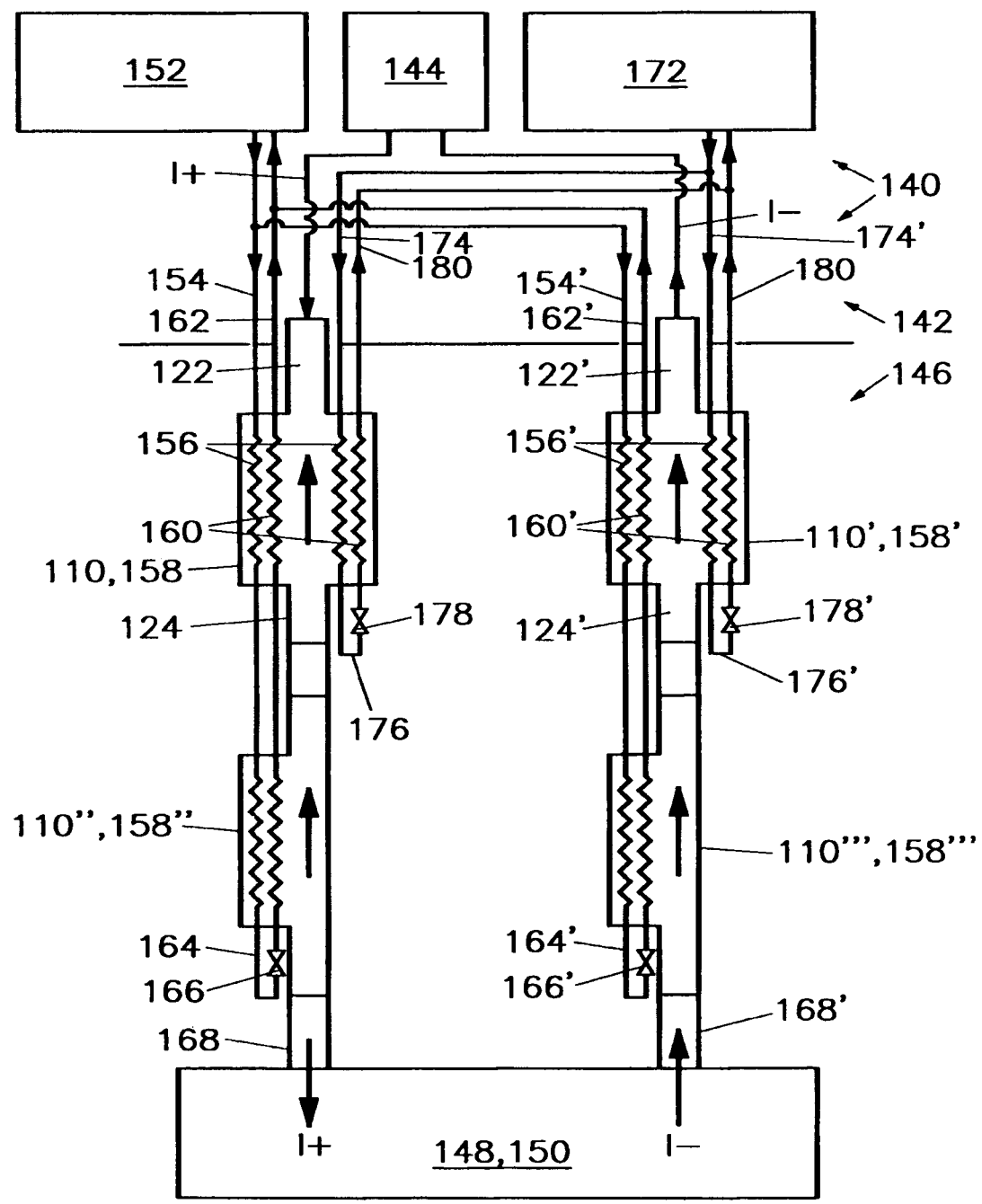
FIG. 5 schematic diagrams of preferred working examples of a two-stage device for generation of cryogenic temperatures and for transport of electrical energy, wherein the device comprises power supplies according to the invention.
Figure 5B:
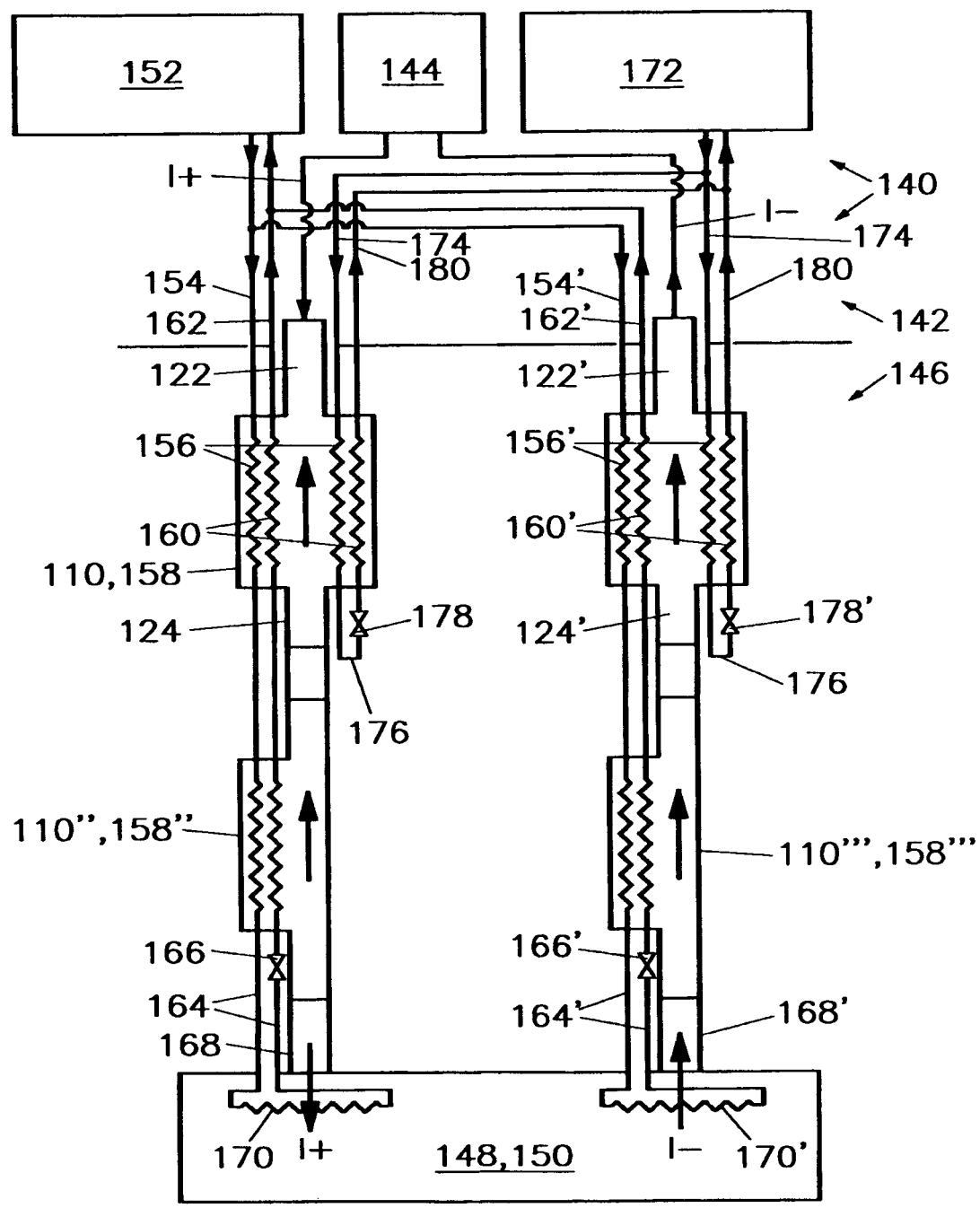

FIGS. 5a and 5b each show a schematic diagram of a preferred working example in which the respective device 140 has a two-stage configuration for generation of cryogenic temperatures and for transport of electrical energy from the energy source 142 disposed in the warm region 142 of the device 140 to the application 148 installed in the cold region 146 of the device 140.

Compared to the working example according to FIG. 4a, the working example of the device 140 according to FIG. 5a, in the warm region 142, has a precooler 172 that provides a further wide-boiling coolant mixture comprising a mixture of at least two components of coolants configured for precooling, where at least two of the components here too have a different boiling temperature. The introduction of the further coolant mixture from the warm region 142 into the cold region 146 is effected at high pressure level by means of a further feed 174, 174' in each case, which open in each case into the high pressure sides 156, 156' of the power supplies 110, 110' that are each embodied simultaneously as first heat exchangers 158, 158'. The further coolant mixture that has already been partly cooled down as a result subsequently passes through a respective further conduit 176, 176' into a respective further expansion unit 178, 178'. The release of the cold coolant mixture to the warm region 142 is effected via the respective low pressure side 160, 160' of the first heat exchanger 158, 158' by means of a respective further drain 180, 180'. In addition, the working example of the device 140 according to FIG. 5a, compared to the working example according to FIG. 4a, in the cold region 146, has further power supplies 110", 110'" that are simultaneously used as further first heat exchangers 158", 158'", especially in order to further cool the respective power supplies 110", 110'".

Compared to the working example according to FIG. 5a, the working example of the likewise two-stage device 140 according to FIG. 5b has the two second heat exchangers 170, 170' that are each configured to cool the application 148 in the cold region 146. For this purpose, the coolant mixture that has already been partly cooled in each first heat exchanger 158, 158', 158", 158—passes via the respective further conduit 164, 164' and the respective expansion unit 166, 166' to the respective second heat exchanger 170, 170'.

LIST OF REFERENCE NUMERALS

| | |
|---|---|
| 110, 110' . . . | power supply |
| 112 | upper cover plate |
| 114, 114' . . . | port |
| 116 | lower cover plate |
| 118 | stack |
| 120, 120' . . . | foil |
| 122, 122' . . . | first electrical terminal |
| 124, 124' . . . | second electrical terminal |
| 126, 126' . . . | passage |
| 128 | flow duct |

-continued

| | |
|---|---|
| 130 | entry region |
| 130' | exit region |
| 132, 132' | distributor element |
| 134 | first flow pathway |
| 134' | second flow pathway |
| 134" | third flow pathway |
| 134'" | fourth flow pathway |
| 136 | elevation |
| 138 | depression |
| 140 | device |
| 142 | warm region |
| 144 | energy source |
| 146 | cold region |
| 148 | application |
| 150 | high-temperature superconductor |
| 152 | cooler |
| 154, 154' | feed |
| 156, 156' | high-pressure side |
| 158, 158' . . . | first heat exchanger |
| 160, 160' | low-pressure side |
| 162, 162' | drain |
| 164, 164' | further conduit |
| 166, 166' | first expansion unit |
| 168, 168' | high-temperature superconductor |
| 170 | second heat exchanger |
| 172 | precooler |
| 174, 174' | further feed |
| 176, 176' | further conduit |
| 178, 178' | further expansion unit |
| 180, 180' | further drain |

The invention claimed is:

1. A power supply for transport of electrical energy from an energy source to a superconducting application or from the superconducting application to the energy source, wherein the power supply is configured to transport an electrical current from a normal circuit comprising the energy source to a circuit comprising at least one superconductor, wherein the energy source is disposed in a warm region and wherein the superconducting application is disposed in a cold region, wherein the power supply has a stack comprising at least two foils, wherein each foil comprises an electrically conductive material configured to transport the electrical energy, wherein each foil has an electrical terminal configured to receive the electrical energy or to release the electrical energy, and wherein each foil comprises a multitude of flow ducts for guiding a fluid stream, wherein the fluid stream comprises a coolant mixture or a gas stream to be cooled or a gas stream to be liquefied, wherein the foils encompassed by the stack have a first flow pathway through the flow ducts which is configured to receive the fluid stream at high pressure level from the warm region, and a second flow pathway through the flow ducts which is configured to receive the fluid stream at low pressure level from the cold region.

2. The power supply of claim 1, wherein the foil has at least one further flow pathway selected from
 a third flow pathway through the flow ducts which is configured to receive a vapor phase of the coolant mixture at low pressure level from the cold region;
 a fourth flow pathway through the flow ducts which is configured to receive the gas stream to be cooled or the gas stream to be liquefied from the warm region.

3. The power supply of claim 1, wherein all flow ducts in each foil of a stack are configured either to receive the fluid stream from the warm region or to receive the fluid stream at low pressure level from the cold region.

4. The power supply of claim 1,
   wherein the flow ducts of adjacently stacked foils in the stack are configured alternately to receive the fluid stream at high pressure level and to receive the fluid stream at low pressure level, or
   wherein the flow ducts of not more than two adjacently stacked foils in the stack are configured to receive the fluid stream at high pressure level, and an adjoining further foil is configured to receive the fluid stream at low pressure level, or
   wherein the flow ducts of not more than two adjacently stacked foils in the stack are configured to receive the fluid stream at low pressure level, and an adjoining further foil is configured to receive the fluid stream at high pressure level.

5. The power supply of claim 1, wherein the flow ducts are each introduced on one side of each foil, wherein adjacently stacked foils are introduced into the stack in a manner that openings in the flow ducts are arranged so as to face away from one another.

6. The power supply of claim 1, wherein each foil has an entry region and an exit region for the flow ducts, wherein at least the entry region or the exit region has a distributor element configured to divide the fluid stream between the flow ducts of the foil.

7. The power supply of claim 1, wherein at least one side of the stack is provided with a cover plate, wherein at least one of the cover plates in each case has at least one feed for supply of the fluid stream and a drain for removal of the fluid stream.

8. The power supply of claim 1, wherein the electrically conductive material is selected from copper, aluminum or brass.

9. A device for generation of cryogenic temperatures and for transport of electrical energy from an energy source to an application or from the application to the energy source, comprising at least one cooling stage having a warm region and a cold region, wherein a coolant mixture configured for the cooling stage and the energy source are provided in the warm region, wherein the coolant mixture includes at least two components having different boiling temperatures, wherein the cold region of at least one cooling stage comprises the following:
   at least one power supply of claim 1, wherein the at least one power supply is simultaneously embodied as first heat exchanger;
   at least one first expansion unit configured for expansion and for cooling of the coolant mixture to low pressure level; and
   the application (which is configured to at least one of receive the electrical energy or release the electrical energy.

10. The device of claim 9, further comprising a second heat exchanger configured to cool the application.

11. A method for cooling and for operation of high-temperature superconductors at a temperature of 15 K to 90 K comprising a step of generating cryogenic temperatures and for transport of electrical energy from an energy source to the superconducting application or from the superconducting application to the energy source with a device of claim 9.

12. A method of producing a power supply of claim 1, wherein the power supply is configured to transport electrical energy from an energy source to the superconducting application or from the superconducting application to the energy source, wherein the energy source is disposed in a warm region and wherein the superconducting application is disposed in a cold region, comprising the following steps:
   a) providing at least two foils, wherein each foil comprises an electrically conductive material configured to transport electrical energy, wherein each foil at each end has an electrical terminal configured to receive electrical energy or to release the electrical energy;
   b) introducing a multitude of flow ducts configured to receive a fluid stream into the at least two foils;
   c) arranging the at least two foils in the form of a stack and diffusion welding the at least two foils, wherein the electrical terminal of each foil in the cold region remains unwelded.

13. The method of claim 12, wherein the multitude of flow ducts is introduced into the at least two foils by using an etching method or microetching.

14. The method of claim 12, wherein the arranging of the at least two foils in the form of the stack comprises the placing of at least one cover plate on at least one side of the stack, wherein the diffusion welding of the at least two foils comprises the at least one cover plate, wherein the method includes the further step of:
   d) in each case introducing at least one port configured for at least one of supply or removal of the fluid stream into at least one of the cover plates.

15. The method of claim 12, wherein the method comprises the further step of:
   e) placing at least one high-temperature superconductor onto the electrical terminal of the foils configured to release the electrical energy to the application or to receive the electrical energy from the application.

* * * * *